United States Patent [19]

Mölders et al.

[11] Patent Number: 4,474,271
[45] Date of Patent: Oct. 2, 1984

[54] SHOCK ABSORBER UNIT

[75] Inventors: Werner Mölders, Plaidt; Hans Pohlenz, Koblenz, both of Fed. Rep. of Germany

[73] Assignee: Stabilus GmbH, Koblenz-Neuendorf, Fed. Rep. of Germany

[21] Appl. No.: 378,638

[22] Filed: May 17, 1982

[30] Foreign Application Priority Data

May 20, 1981 [DE] Fed. Rep. of Germany ....... 3120016

[51] Int. Cl.³ .......................... B61K 7/02; F16F 9/50
[52] U.S. Cl. .................................... 188/280; 188/62; 188/282; 188/317; 188/322.15
[58] Field of Search .................. 188/280, 62, 63, 272, 188/281, 282, 284, 313, 314, 317, 316, 320, 322.11, 322.13–322.15, 134; 32; 267/120, 124, 64.15; 104/26 A, 26 R, 162, 163

[56] References Cited

U.S. PATENT DOCUMENTS 3,040,676  6/1962  Checkley et al. ............... 188/280 X

FOREIGN PATENT DOCUMENTS

| 2800630 | 7/1979 | Fed. Rep. of Germany . |
| 575132 | 2/1946 | United Kingdom . |
| 677176 | 8/1952 | United Kingdom . |
| 1132713 | 11/1968 | United Kingdom . |
| 1135572 | 12/1968 | United Kingdom . |
| 1317253 | 5/1973 | United Kingdom . |
| 2071807 | 9/1981 | United Kingdom ................ 188/280 |
| 2099544 | 12/1982 | United Kingdom ................ 188/280 |
| 796553 | 1/1981 | U.S.S.R. ............................ 188/280 |

Primary Examiner—Douglas C. Butler
Attorney, Agent, or Firm—Brumbaugh, Graves, Donohue & Raymond

[57] ABSTRACT

A shock absorber comprises a cylinder and a piston rod passing through at least one end of the cylinder. A piston unit is mounted on the piston rod and divides the cavity within the cylinder into two working chambers. A damping fluid is contained within the cylinder. The working chambers are interconnected across the piston unit by first and second branch flow passages arranged in parallel. First and second flow valves are associated with these first and second flow passages, respectively, and operate to dampen movement of the piston rod in at least one direction in dependency on the velocity of movement. The first branch passage flow valve is normally open and closes only when a predetermined velocity of movement is exceeded. The second branch passage flow valve is normally closed and opens only when the pressure differential between the working chambers exceeds a predetermined value. Closing of the first branch passage flow valve increases the damping effect. Opening of the second branch passage flow valve, which preferably occurs approximately at the same rod speed that the first valve closes, provides a further gradual increase in damping force upon further increase in rod velocity.

17 Claims, 6 Drawing Figures

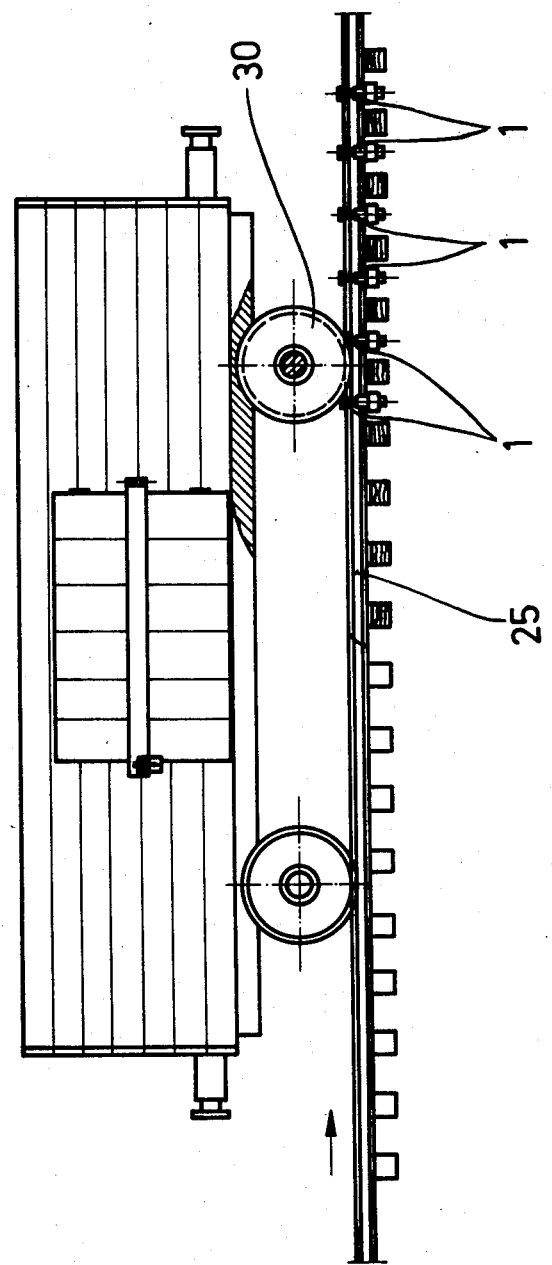

SHOCK ABSORBER UNIT

BACKGROUND

1. Field of the Invention

The present invention relates to shock absorbers and, more particularly, to an improved shock absorber unit that is especially adapted for applications in which high damping forces occur.

2. The Prior Art

In the type of shock absorber disclosed in German Offenlegungsschrift 28 00 630, which is particularly intended for ski bindings, the piston unit comprises a piston member and a valve member, both of which are axially movable along the piston rod. The piston member and the valve member are biased in the same direction towards respective rest positions. A first flow passage is provided in the piston member, and a second flow passage is formed in part by a gap between the adjacent faces of the piston member and the valve member. The first and the second flow passages are connected in series; i.e., so that the damping fluid flows first through one and then the other of the two passages. When the piston rod is moved in a predetermined direction at low speed, fluid passes sequentially through the two passages from one working chamber to the other working chamber. When the speed is increased, the piston member is axially moved against the biasing force acting thereon due to the pressure drop across the first flow passage. The second flow passage is thereby reduced in flow cross-section, with the result that an increased pressure drop occurs across the second flow passage. This causes the valve member to be axially moved away from its rest position against the biasing action acting thereon, so that the second flow passage is again increased in cross-section.

The foregoing known construction being particularly useful for ski bindings is less adapted for applications in which high damping forces occur. In such applications, there is a risk of damage to the piston member due to high pressure of the damping fluid. Also, the piston member is likely to be expanded in the radial outward direction, so that increased friction occurs between the piston member and the cylinder. As a consequence, the damping characteristics of the unit can be undesirably altered. Moreover, it is at best difficult with such units to obtain certain desired damping characteristics, such as, for example, a damping characteristic according to which a low or even negligible damping force is provided at low velocity of movement of the piston rod, whereas upon the piston rod velocity exceeding a predetermined value, the damping force is suddenly increased to a considerably higher value which is subsequently gradually further increased upon further increase of the piston rod velocity.

SUMMARY OF THE INVENTION

It is an object of this invention to provide a shock absorber which is highly reliable in function, even when high damping forces occur.

A further object is to provide a shock absorber which is substantially free of alteration of its damping characteristics, even when high damping forces occur.

Yet a further object of the invention is to provide a shock absorber which permits damping characteristics not easily achievable in shock absorbers as known in the art.

The foregoing and other objects of the invention are attained by the provision of a shock absorber unit in which first and second branch flow passages are provided in parallel across the piston unit between the working chambers. First and second branch passage valves are associated with the first and second branch passages, respectively. The first branch passage valve is spring-loaded towards an open position in which the first branch flow passage is open and is movable to a closed position, in response to the velocity of the piston rod in one axial direction exceeding a predetermined value, to close the first branch flow passage. The second branch passage valve is spring-loaded towards a closed position in which the second branch flow passage is closed and is movable to an open position, in response to the pressure differential between the two working chambers exceeding a predetermined value as a result of the movement of the piston rod in the one direction, to open the second branch flow passage. The piston rod would normally be biased, and preferably undampened, in the direction opposite to the aforementioned damping direction.

It will be readily appreciated that the spring characteristics of the shock absorber of the invention can be easily altered by varying the spring load acting on the first and/or second branch passage valves. Preferably, the fluid within the cavity is under substantially atmospheric pressure, with the piston rod being biased in the axially outward direction by a mechanical thrust spring; for example, a helical compression spring. In this preferred embodiment, there is no risk of unintended alteration of the spring characteristics due to escape of fluid from the cavity.

An advantageous, but not exclusive, field of application for the shock absorber of the invention is a railbound damping unit for decelerating the speed of rail vehicles; for example, in shunting operation of such vehicles.

BRIEF DESCRIPTION OF THE DRAWINGS

For a better understanding of the invention, its operating advantages and the specific objects attained by its use, reference should be had to the following description of illustrative embodiments thereof and to the accompanying drawings, in which:

FIG. 6 shows a plurality of rail-mounted dampers arranged in series along a railway.

DETAILED DESCRIPTION

Figure 1:
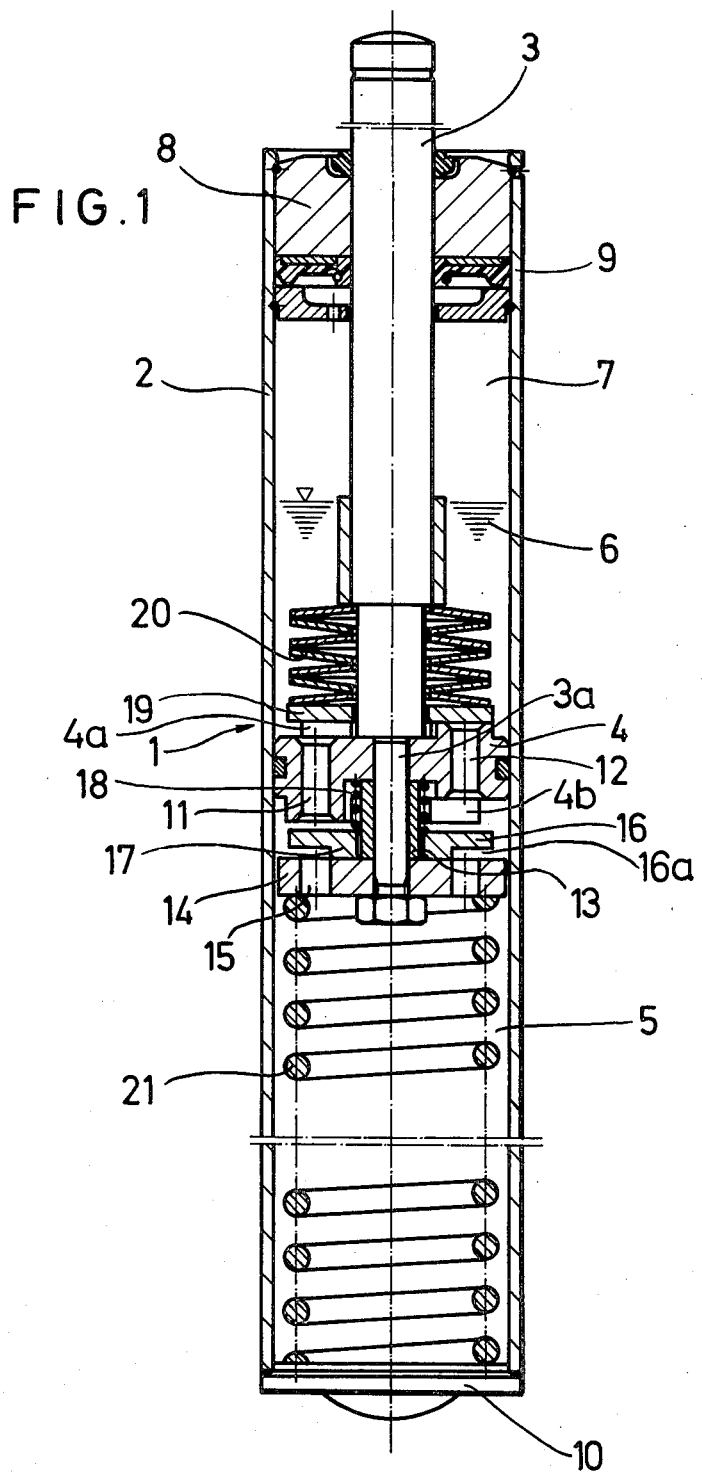
FIG. 1 shows a shock absorber of this invention in longitudinal section in the rest condition.
Figure 2:
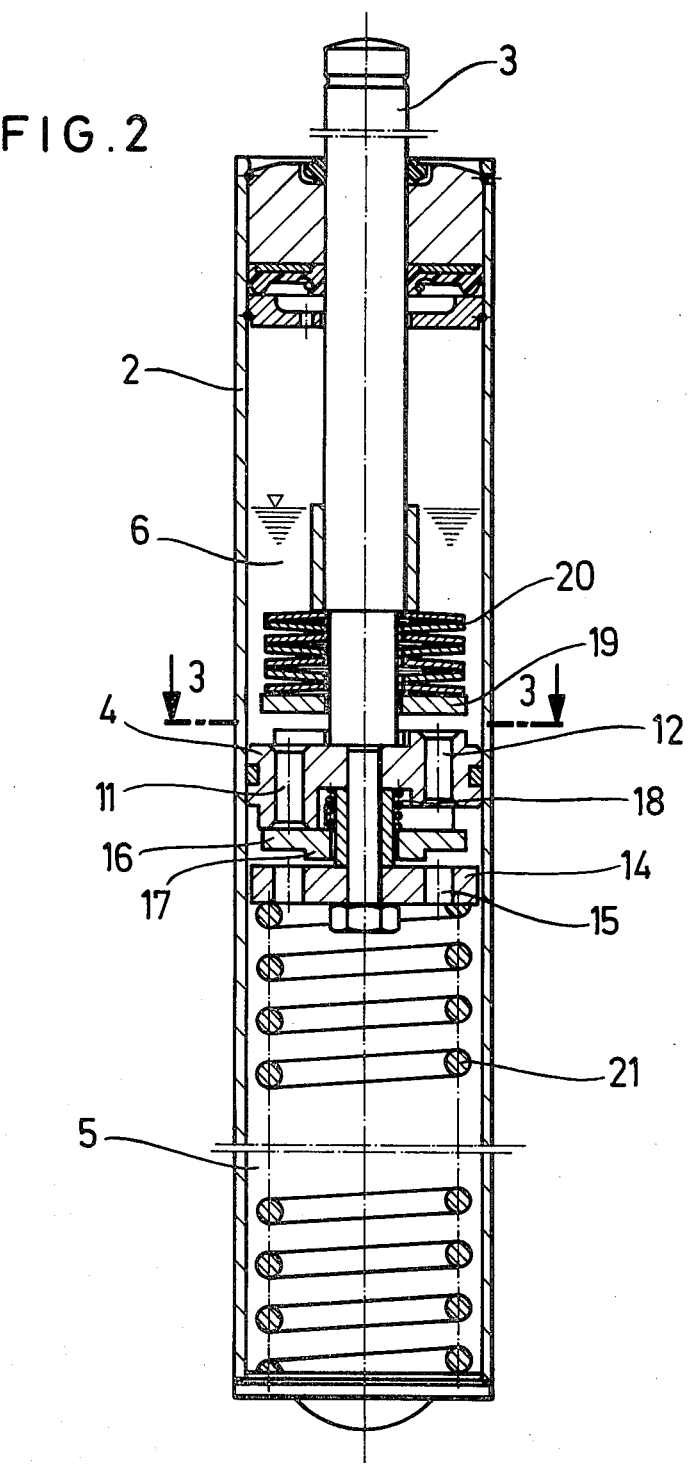
FIG. 2 shows the shock absorber in longitudinal section in a condition of rapid inward movement of the piston rod.
Figure 3:
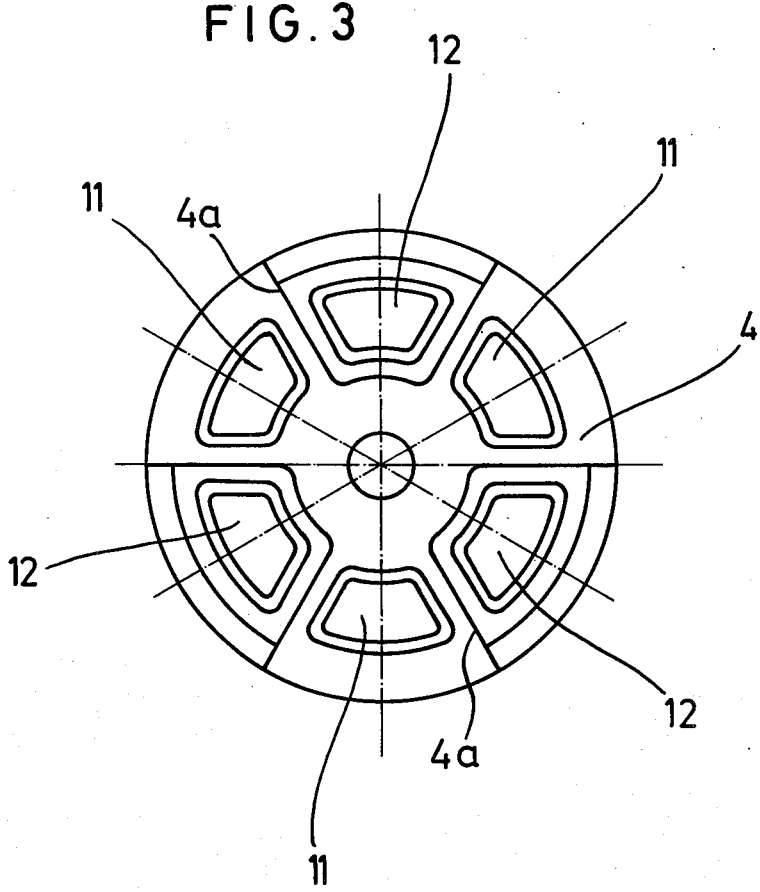
FIG. 3 shows a plan view of the piston according to FIGS. 1 and 2, taken along the line 3—3 and looking in the direction of the arrows.

The shock absorber 1 according to FIGS. 1, 2 and 3 includes a cylinder 2, a piston rod 3 and a piston 4, the rod and piston unit being axially slidable relative to the cylinder. The interior of the cylinder 2 is divided by the piston 4 into a working chamber 5 beneath the piston and a working chamber 6 above the piston. These working chambers 5 and 6 are filled with a damping liquid, which may, for example, comprise any suitable hydraulic oil as is well known in the art and commonly used in shock absorbers. The compensation chamber 7 adjoining the working chamber 6 is gas-filled, as is also known in the art. The upper end of the cylinder 2 is closed in conventional fashion by the piston rod guide 8 and the piston rod seal 9, while the lower end of the cylinder is tightly closed by the cylinder end piece 10.

In the piston 4 there are formed axial bores 11 and 12 which open through the opposite axially directed end faces of the piston. FIG. 3 depicts the arrangement of the bores 11 and 12 in plan. The piston 4 is secured on an extension 3a of the piston rod 3 with the interposition of the spacing sleeve 13 and the baffle member or disc 14. A valve plate 16 is arranged to be axially movable against the force of a compression spring 18 which surrounds the spacing sleeve 13 and which bears against the piston 4. As long as no axially outwardly directed forces act on the valve plate 16, an abutment collar 17 formed thereon remains pressed by the compression spring 18 against the disc 14. The disc 14 is also provided with axial bores 15. Because of the collar 17, the valve plate 16 is always held out of sealing engagement relative to the bores 15 in the disc 14 even when the plate 16 is in contact with the disc 14.

Another valve plate 19 is subject to the action of a stack of plate springs 20 and is urged by the force of the plate springs 20 against the upper piston end face. In the position shown in FIG. 1, the valve plate 19 closes the upper ends of the bores 12, thereby preventing fluid flow therethrough. Since in the embodiment of FIGS. 1-3 the compensation chamber 7 is not under gas pressure, an outward thrust spring 21 is provided which bears at one end on the cylinder end piece 10 and at the other end on the disc 14. The piston rod 3, therefore, is normally biased outward of the cylinder 2.

The condition illustrated in FIG. 1 corresponds to the rest condition of the shock absorber, and this condition is also maintained both upon outward movement of the piston rod and upon low speed inward movement of the rod. In each of these three working states, the valve plate 19 closes the piston passages 12 under the pressure of the plate springs 20 while the valve plate 16 is held in the FIG. 1 position by the compression spring 18. Hence the working chambers 5 and 6 are continuously interconnected in liquid conducting manner via the recesses 4a of the piston 4, the piston bores or passages 11, the annular recess 16a of the valve plate 16 (formed by the collar 17), and the axial bores 15 of the disc 14.

During outward movement of the piston rod 3 with respect to the cylinder 2, damping liquid flows out of the working chamber 6 through the piston passages 11 into the working chamber 5, the outward movement being effected by the outward thrust spring 21. The damping effect during this movement is preferably so small as to be substantially negligible. This provides for the quick return of the piston rod to the extended position.

Low speed inward movement of the piston rod 3 likewise takes place without appreciable damping effect, since in this case the damping liquid flows out of the working chamber 5 into the working chamber 6 via the bores 15, the annular recess 16a, the passages 11 and the recesses 4a. It will be understood that, for this purpose, it is a prerequisite that the force exerted by the liquid flow upon the valve plate 16 is less than the force of the compression spring 18. Thus in case of a slow inward movement of the piston rod 3 only the force of the outward thrust spring 21 has to be overcome.

If the speed of inward movement of the piston rod 3 exceeds a predetermined value, which is determined by the spring force of the compression spring 18, the valve plate 16 is urged, against the force of the compression spring 18, by the liquid flowing through the openings 15 of the disc 14 against the lower end face of the piston 4, thereby closing the passages 11. In this transitional working condition, no fluid connection of any kind is open between the working chambers 5 and 6. On further inward directed thrust onto the piston rod 3, however, the pressure in the working chamber 5 rises until it overcomes the spring force of the plate springs 20, whereupon the valve plate 19 is lifted away from the upper end face of the piston. A liquid-conducting connection from the working chamber 5 to the working chamber 6 is thus established via the bores 15, the recess 16a, the recesses 4b of the piston 4 and the passages 12. This working condition is shown in FIG. 2.

As will be understood, the force of the plate springs 20 is a measure for the damping force at the beginning of opening of the passages 12. Thus by variation of the spring force of the plate springs 20, the damping force corresponding to the commencement of opening of the passages 12 can be varied. Since the damping liquid situated in the working chamber 5 is practically incompressible, closure of the valve plate 16 and the opening of the valve plate 19 takes place at nearly the same inward speed of the piston rod 3.

It will be noted that two separate flow passages across the piston unit are provided, one via the bores 15, recess 16A, bores 11 and the recesses 4a and the other via the bores 15, recess 16a, recesses 4b and the bores 12, and that these two flow passages are in parallel. That is to say, fluid flow across the piston unit is exclusively through one or the other of the two flow passages, not sequentially through one and then the other as in the above-described prior art shock absorber.

Figure 4:
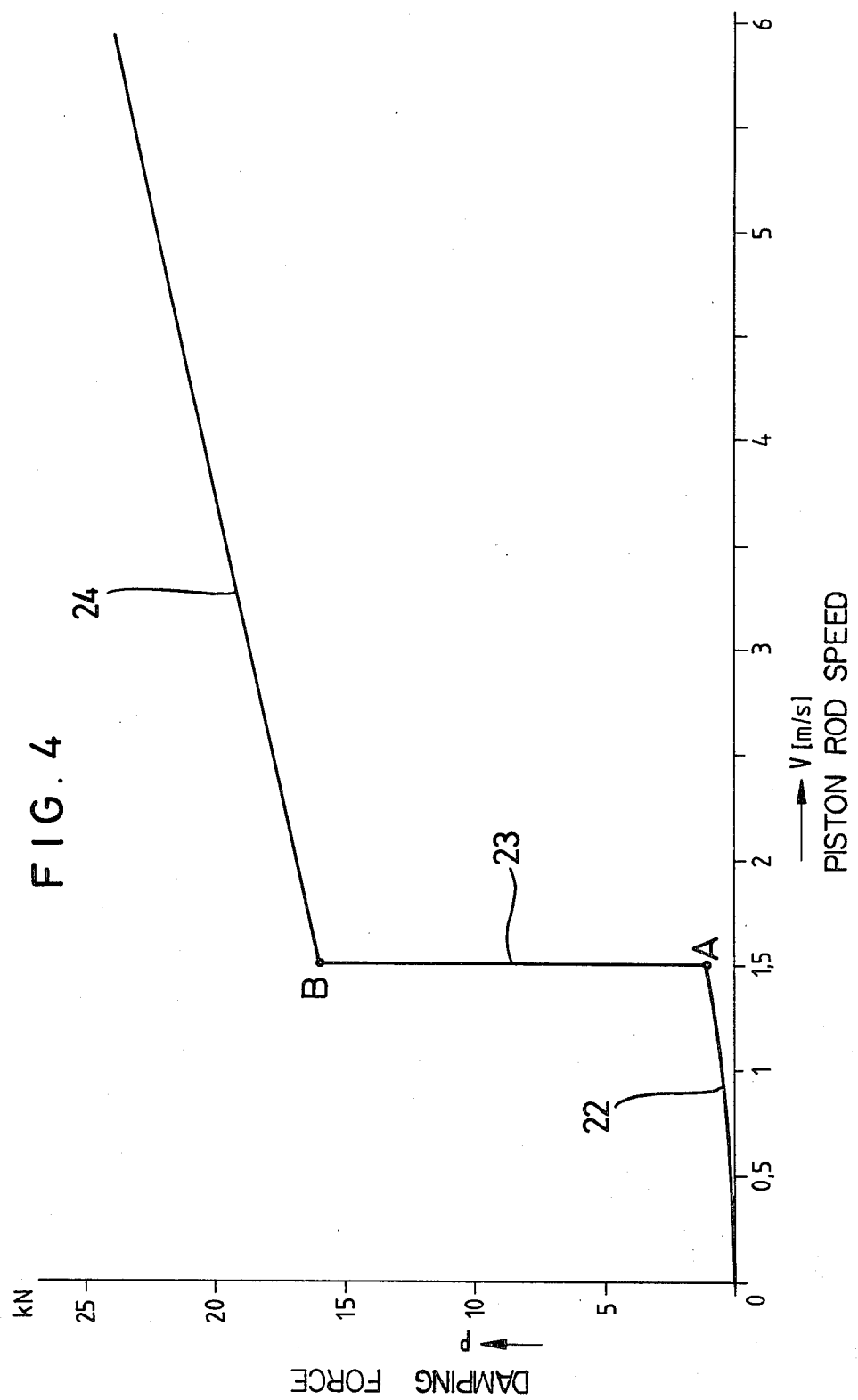
FIG. 4 is a graph of damping force vs. the speed of the inward movement of the piston rod for the shock absorber of FIGS. 1-3.

In FIG. 4 there is shown the variation of damping force P (in Newtons) of the shock absorber of FIGS. 1-3 in dependence upon the speed V (in m/sec) of inward movement of the piston rod. If, for example, a vehicle is to be braked by one or more such shock absorbers, the vehicle will not be braked by the shock absorber up to a speed of about 1.5 m/sec (point A in FIG. 4), but at higher speeds braking forces will be exerted by the shock absorber upon the vehicle. Point A represents the point, or speed, at which the valve plate 16 moves to the closed position and seals off the lower ends of the bores 11. Thus the diagram according to FIG. 4 shows that up to a vehicle speed of 1.5 m/sec according to the curve part 22, no appreciable damping force occurs. If the speed of 1.5 m/sec is reached, the passages 11 are closed by the valve plate 16, and the subsequent rise of damping force according to the curve part 23 takes place at nearly constant speed until the point B is reached. At the point B the valve plate 19 opens the passage 12 against the force of the plate springs 20 and a braking force is exerted upon the vehicle in accordance with the course of damping forces indicated by the curve 24. As mentioned, the determination of the damping force at which the valve plate 19 opens is effected by adjusting the plate springs 20.

Figure 5:
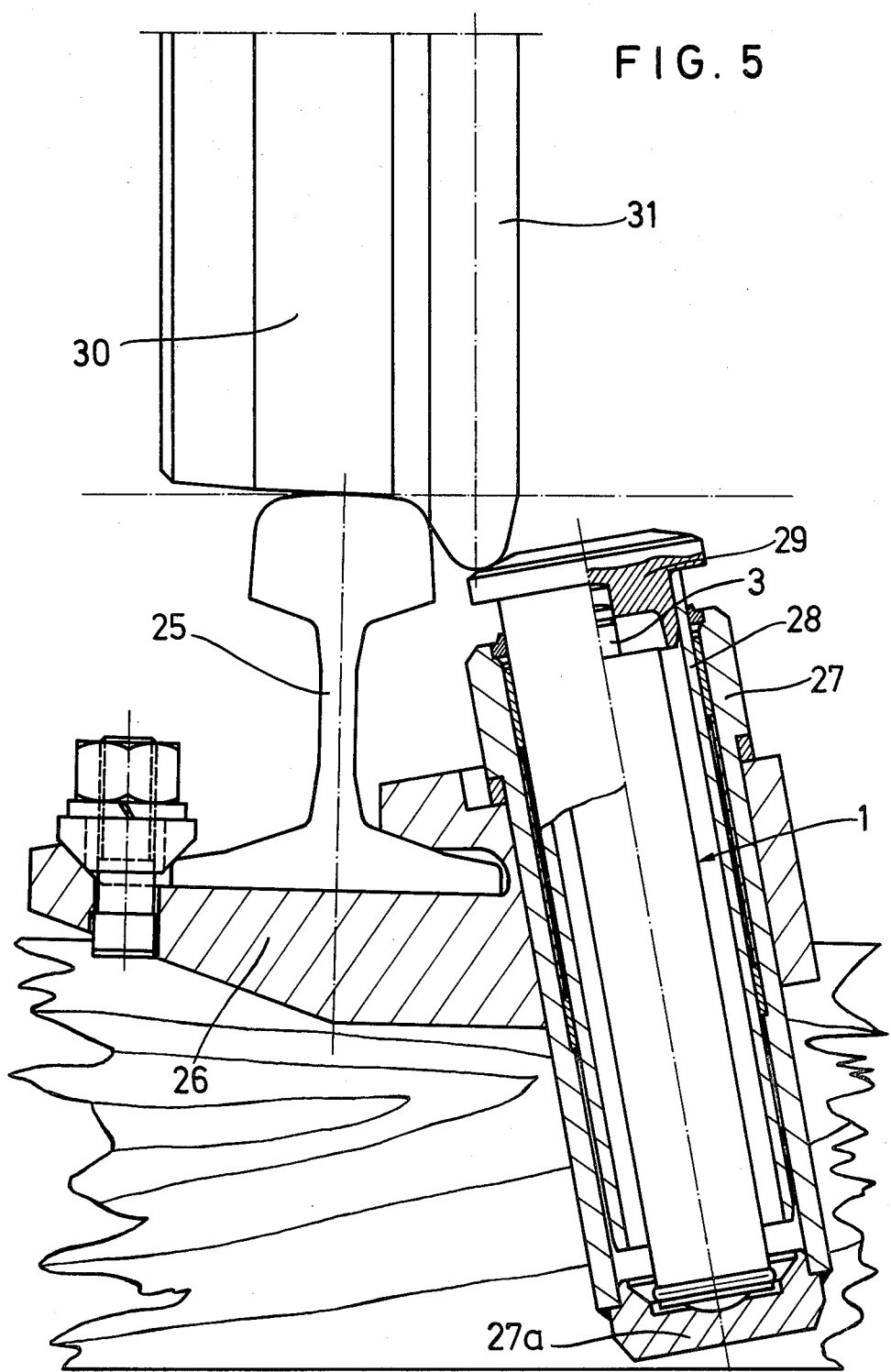
FIG. 5 shows an arrangement of the shock absorber according to FIGS. 1—3 as a rail-mounted damper for a railroad car.

The design of the shock absorbers as illustrated in FIGS. 1 to 3 can advantageously be used for rail-mounted shock absorbers in an arrangement as shown in FIG. 5. As there shown, the shock absorber 1 is connected by means of a container pot 27 and a securing lug 26 with the rail 25. A slide tube 28 is received in the container pot 27 so as to be axially slidable therein. A cap member 29 is fixedly inserted into the outer end of the slide tube 28. The shock absorber 1 is supported at its one end, namely its end piece 10, on the bottom 27a of the container pot 27, whereas the outer end of the piston rod 3 acts against the cap member 29. As each car wheel 30 rolls over the rail section 25, the rim 31 thereof pushes the piston rod into the cylinder of the shock absorber 1. According to the travelling speed of the rail vehicle, more or less braking is effected by the shock absorber, as explained above in connection with FIG. 4.

By use of a plurality of such shock absorbers arranged in series in the direction of travel of the rail vehicle, as shown by FIG. 6, it is possible gradually to adjust the braking of the vehicle to the intended speed. Since the outward movement of the piston rod takes place practically undamped, the shock absorber will return quickly to the extended position and thus will be effective for each wheel 30. The arrangement of the shock absorber 1 between the sleepers of the rail 25 as shown in FIG. 6 corresponds to the mounting configuration depicted in FIG. 5.

Use of the shock absorber of the invention is of course not limited solely to rail-mounted dampers, and it will be understood that the invention has ready application to other uses as well; for example, as safety devices to limit the speed of trucks or other conveying vehicles.

Although the invention has been described with reference to specific embodiments thereof, many modifications and variations of such embodiments may be made without departing from the inventive concepts disclosed. For example, it is possible to replace the thrust spring 21 by a volume of compressed gas. It is further possible to completely fill the cylinder with gas under superatmospheric pressure. Accordingly, all such modifications and variations are intended to be included within the spirit and scope of the appended claims.

We claim:

1. In a shock absorber unit comprising (a) a cylinder having an axis and two end walls, a cavity being defined within said cylinder between said two end walls; (b) a piston rod passing through at least one of said two end walls and being movable along said axis; (c) a piston unit mounted on said piston rod between said two end walls and dividing said cavity into two working chambers; (d) a damping fluid contained within said cavity; (e) flow passage means connecting said two working chambers across said piston unit; and (f) spring-biased valve means associated with said flow passage means for damping axial movement of said piston rod in at least one direction of movement along said axis, damping effect being dependent on the velocity of said movement; the improvement which comprises:
   (g) said flow passage means including first and second branch passage means connected in parallel between said two working chambers; and
   (h) first and second branch passage valve means associated with said first and second branch passage means, respectively, said first branch passage valve means being spring-loaded towards an open position in which said first branch passage means is substantially open to fluid flow and being movable towards a closed position in response to said velocity of movement of said piston rod in said one direction exceeding a predetermined value at which said spring-loading is overcome, said first branch passage means being substantially closed to fluid flow when said first branch passage valve means is in said closed position, said second branch passage valve means being spring-loaded towards a closed position in which said second branch passage means is substantially closed to fluid flow and being movable towards an open position in response to the pressure differential between said first and second working chambers exceeding a predetermined value, at which said spring-loading of said second branch passage valve means is overcome, as a result of said movement of said piston rod in said one direction.

2. A shock absorber unit as set forth in claim 1, further comprising piston rod biasing means for biasing said piston rod towards one terminal position with respect to said cylinder.

3. A shock absorber unit as set forth in claim 2, wherein said movement in said one direction is in opposition to the biasing action of said piston rod biasing means.

4. A shock absorber unit as set forth in claim 2, wherein said fluid within said cavity is under substantially atmospheric pressure and said biasing means comprises a thrust spring.

5. A shock absorber unit as set forth in claim 1, wherein said piston unit comprises a piston member having substantially axially directed end faces adjacent to respective ones of said working chambers, and wherein each of said first and second branch passage means includes at least one substantially axially directed bore extending through said piston member and opening through said end faces.

6. A shock absorber unit as set forth in claim 5, wherein said first branch passage valve means comprises an axially movable first valve member spring-loaded towards said open position and movable towards said closed position.

7. A shock absorber unit as set forth in claim 6, wherein said piston unit includes a baffle member fixed thereto and having an orifice extending therethrough, said first valve member being in axial alignment with said orifice of said baffle member, fluid flowing through said orifice when said piston rod moves in said one direction, said flow of fluid impinging said first valve member and urging said first valve member towards said closed position when a predetermined speed of movement of said piston rod in said one direction is exceeded.

8. A shock absorber unit as set forth in claim 7, wherein said first valve member is axially movably mounted between said baffle member and said piston member.

9. A shock absorber unit as set forth in claim 8, wherein said first valve member comprises a fluid impingement face axially aligned with said orifice, said fluid impingement face and said orifice defining a constantly open flow path even when said first valve member is in said open position.

10. A shock absorber unit as set forth in claim 8, wherein said first valve member is spring-loaded towards said open position by first valve spring means axially interposed between said piston member and said first valve member.

11. A shock absorber unit as set forth in claim 6, wherein said first valve member is mounted adjacent a first one of said end faces of said piston member, said first valve member when in said closed position engaging said adjacent end face to close each said axial bore of said first branch passage means extending through said piston member.

12. A shock absorber unit as set forth in claim 5, wherein said second branch passage valve means comprises a second valve member spring-loaded towards said closed position with respect to each said axial bore of said second branch passage means and movable by said pressure differential towards said open position with respect to each said axially extending bore of said second branch passage means.

13. A shock absorber unit as set forth in claim 12, wherein said second valve member is adjacent to a second one of the end faces of said piston member and engages said adjacent end face when in said closed position to close each said axial bore of said second branch passage means.

14. A shock absorber unit as set forth in claim 12, wherein said second valve member is spring-loaded by second valve spring means supported by said piston rod.

15. A shock absorber unit as set forth in claim 1, wherein at least one of said spring-loaded branch passage valve means comprises a plate-shaped valve member.

16. In a fluid-damped braking system for a railway vehicle, comprising a shock absorber unit arranged at a location along a rail for the railway vehicle; the shock absorber unit including (a) a cylinder having an axis and two end walls, a cavity being defined within said cylinder between said two end walls; (b) a piston rod passing through at least one of said two end walls and being movable along said axis; (c) a piston unit mounted on said piston rod between said two end walls and dividing said cavity into two working chambers; (d) a damping fluid contained within said cavity; (e) flow passage means connecting said two working chambers across said piston unit; and (f) spring-biased valve means associated with said flow passage means for damping axial movement of said piston rod in at least one direction of movement along said axis, damping effect being dependent on the velocity of said movement; one of said cylinder and said piston rod being fixed with respect to said rail and the other of said cylinder and said piston rod being engageable by a wheel of said railway vehicle when passing said location, said piston rod being moved with respect to said cylinder in said one direction in response to such engagement, the improvement in said shock absorber unit comprising:

(g) said flow passage means including first and second branch passage means connected in parallel between said two working chambers; and (h) first and second branch passage valve means associated with said first and second branch passage means, respectively, said first branch passage valve means being spring-loaded towards an open position in which said first branch passage means is substantially open to fluid flow and being movable towards a closed position in response to said velocity of movement of said piston rod in said one direction exceeding a predetermined value at which said spring-loading is overcome, said first branch passage means being substantially closed to fluid flow when said first branch passage valve means is in said closed position, said second branch passage valve means being spring-loaded towards a closed position in which said second branch passage means is substantially closed to fluid flow and being movable towards an open position in response to the pressure differential between said first and second working chambers exceeding a predetermined value, at which said spring-loading of said second branch passage valve means is overcome, as a result of said movement of said piston rod in said one direction.

17. A braking system as set forth in claim 16, wherein a plurality of shock absorber units are arranged in series along said rail for successive engagement by said vehicle wheel.

* * * * *